US009727105B2

(12) United States Patent
Lee et al.

(10) Patent No.: US 9,727,105 B2
(45) Date of Patent: Aug. 8, 2017

(54) METHOD AND APPARATUS FOR ADJUSTING CONNECTION SPEED OF USB DEVICE

(71) Applicant: Samsung Electronics Co., Ltd., Gyeonggi-do (KR)

(72) Inventors: Woo-Kwang Lee, Gyeonggi-do (KR); Chi-Jung Ha, Gyeonggi-do (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 401 days.

(21) Appl. No.: 14/326,401

(22) Filed: Jul. 8, 2014

(65) Prior Publication Data

US 2015/0012772 A1    Jan. 8, 2015

(30) Foreign Application Priority Data

Jul. 8, 2013    (KR) .................. 10-2013-0079445

(51) Int. Cl.
*G06F 13/00*    (2006.01)
*G06F 1/26*    (2006.01)
*G06F 13/42*    (2006.01)

(52) U.S. Cl.
CPC ............ *G06F 1/26* (2013.01); *G06F 13/4282* (2013.01); *G06F 2213/0042* (2013.01)

(58) Field of Classification Search
CPC ..................... G06F 13/4282; G06F 2213/0042
See application file for complete search history.

(56) References Cited

U.S. PATENT DOCUMENTS

| 8,078,973 B1* | 12/2011 | Luttmann | G06F 3/0605 715/705 |
| 2006/0082821 A1* | 4/2006 | Yamaya | H04N 5/772 358/1.15 |
| 2007/0162949 A1* | 7/2007 | Nitta | H04N 5/772 725/134 |
| 2011/0231685 A1* | 9/2011 | Huang | G06F 1/3203 713/321 |

FOREIGN PATENT DOCUMENTS

| JP | 2013-016096 | 1/2013 |
| KR | 10-2002-0057697 | 7/2002 |
| KR | 10-2008-0049902 | 6/2008 |

OTHER PUBLICATIONS

Extended European Search Report dated Nov. 19, 2014 in connection with European Patent Application No. 14175623.9; 4 pages.
"Universal Serial Bus Specification"; Rev. 2.0; vol. 1; retrieved from http://www.usb.org/developers/docs/usb_20_052510.zip; Apr. 27, 2000: 650 pages.

* cited by examiner

*Primary Examiner* — Zachary K Huson

(57) ABSTRACT

A method for adjusting connection speed of a USB device includes determining connection speed of the USB device connected to the electronic device, recognizing whether an enhancement event for the connection speed of the USB device is generated, and enhance the connection speed of the USB device when the enhancement event occurs. An electronic device includes the at least one processor configured to determine a connection speed of the USB device connected to the electronic device, recognize whether an enhancement event for the connection speed of the USB device occurs, and enhance the connection speed of the USB device when the restoration event occurs.

20 Claims, 8 Drawing Sheets

METHOD AND APPARATUS FOR ADJUSTING CONNECTION SPEED OF USB DEVICE

PRIORITY

The present application is related to and claims the benefit under 35 U.S.C. §119(a) of a Korean patent application No. 10-2013-0079445 filed in the Korean Intellectual Property Office on Jul. 8, 2013, the entire disclosure of which is hereby incorporated by reference.

TECHNICAL FIELD

The present disclosure relates to a method for adjusting connection speed of a Universal Serial Bus (USB) device and an electronic device thereof.

BACKGROUND

Each of electronic devices, which has become necessities of modern people due to ease in carrying it, has been developed into each of multimedia devices which provides various services such as a voice and video communication service, an information input and output service, and a data transmission and reception service.

When a user of the electronic device connects a USB device to the electronic device to transmit data, the electronic device determines connection speed with the USB device. For example, when the USB device supports USB 3.0, the electronic device attempts to connect at super speed (maximum connection speed supported in USB 3.0), high speed (maximum connection speed supported in USB 2.0), and low speed (maximum connection speed supported in USB 1.0) successively. Herein, there is an inconvenience in that the user of the electronic device must use the USB device at low speed which is slower than the super speed before connecting to the USB device again when the USB device supporting the USB 3.0 connects to the electronic device at the low speed.

Therefore, it is needed to provide an apparatus and method for restoring connection speed with the USB device such that the USB device operates at supportable maximum connection speed.

SUMMARY

To address the above-discussed deficiencies, it is a primary object to provide an apparatus and method for restoring connection speed of a USB device in an electronic device.

Another aspect of the present disclosure is to provide an apparatus and method for displaying connection speed of a USB device on a display unit in an electronic device.

Another aspect of the present disclosure is to provide an apparatus and method for restoring connection speed of a USB device by recognizing whether there is an attempt to connect at connection speed which is faster than current connection speed of the USB device in an electronic device.

Another aspect of the present disclosure is to provide an apparatus and method for blocking power which is being supplied to a USB device, supplying power again, and restoring connection speed of the USB device in an electronic device.

Another aspect of the present disclosure is to provide an apparatus and method for changing a level of current which is being supplied to a USB device and restoring connection speed of the USB device in an electronic device.

Another aspect of the present disclosure is to provide an apparatus and method for changing a USB phytune register value and enhancing a connection speed of a USB device in an electronic device.

Another aspect of the present disclosure is to provide an apparatus and method for changing an equalizer value and enhancing a connection speed of a USB device in an electronic device.

Another aspect of the present disclosure is to provide an apparatus and method for displaying a connection speed adjustment menu of a USB device in an electronic device.

Another aspect of the present disclosure is to provide an apparatus and method for restoring connection speed of a USB device through a connection speed adjustment menu of the USB device in an electronic device.

In accordance with an aspect of the present disclosure, a method of adjusting a connection speed of a USB device in an electronic device is provided. The method includes determining connection speed of the USB device connected to the electronic device, recognizing whether an enhancement event for the connection speed of the USB device is generated, and restoring the connection speed of the USB device when the enhancement event is generated.

In accordance with another aspect of the present disclosure, an electronic device is provided. The electronic device includes at least one processor, at least one memory, and at least one program which is stored in the at least one memory and is configured to be executed by the at least one processor, wherein the at least one processor determines connection speed of the USB device connected to the electronic device, verifies whether a enhancement event for the connection speed of the USB device is generated, and restores the connection speed of the USB device when the enhancement event is generated.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Exemplary embodiments of the present disclosure will be described herein below with reference to the accompanying drawings. In the following description, well-known functions or constructions are not described in detail since they would obscure the disclosure in unnecessary detail.

Hereinafter, a description will be given for an apparatus and method for restoring a connection speed of a USB device in an electronic device.

Hereinafter, the electronic device can be any one of a mobile communication terminal, a Personal Digital Assistant (PDA), a laptop, a smart phone, a netbook, a TeleVision (TV), a Mobile Internet Device (MID), a Ultra Mobile Personal Computer (UMPC), a tablet PC, a navigation device, a digital refrigerator, a digital watch, and a Moving Picture Experts Group (MPEG) layer 3 (MP3) player.

Figure 1:
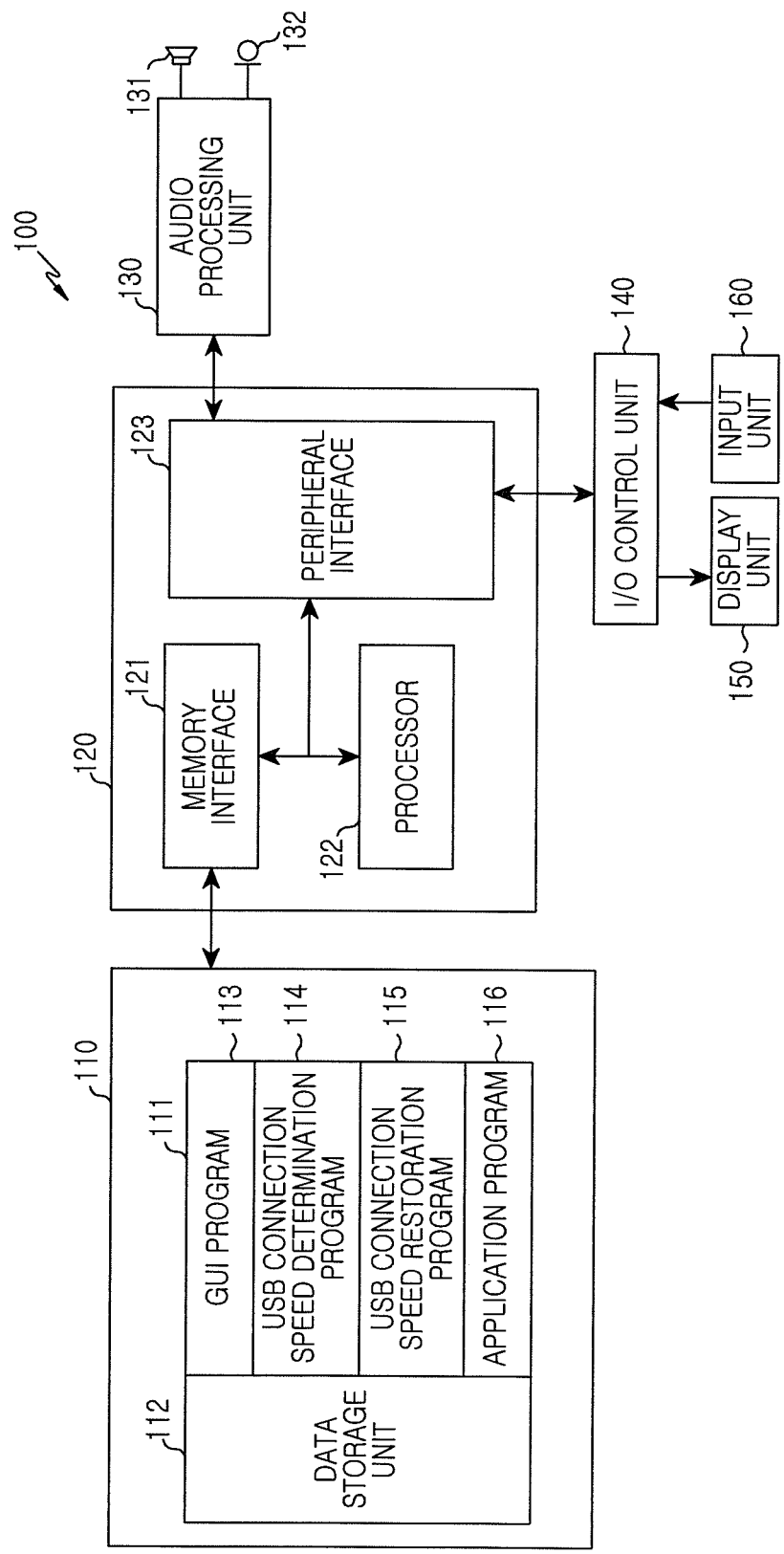
FIG. 1 is a block diagram illustrating configuration of an electronic device according to one embodiment of the present disclosure.

FIG. 1 is a block diagram illustrating configuration of an electronic device according to one embodiment of the present disclosure.

As shown in FIG. 1, the electronic device denoted by 100 can include a memory 110, a processor unit 120, an audio processing unit 130, an Input/Output (I/O) controller 140, a display unit 150, and an input unit 160. Herein, the memory 110 can be a plurality of memories.

A description will be given for respective components as follows.

The memory 110 can include a program storing unit 111 for storing programs for controlling operations of the electronic device 100 and a data storing unit 112 for storing data generated while the programs are executed.

The program storing unit 111 includes a Graphic User Interface (GUI) program 113, a USB connection speed determination program 114, a USB connection speed adjustment program 115, and at least one application program 116. Herein, the programs included in the program storing unit 111 can be expressed in an instruction set as a set of instructions.

The data storing program 112 can store connection speed of a USB device, which is determined by the USB connection speed determination program 114. Also, the data storing program 112 can store a connection speed of a USB device which is attempted to connect by the USB connection speed determination program 114.

The GUI program 113 includes at least one software component for providing a UI as graphics on the display unit 150. For one example, the GUI program 113 controls the display unit 150 to display information of an application program executed by the processor 122. For another example, the GUI program 113 can control the display unit 150 to display a USB connection speed adjustment menu by the USB connection speed adjustment program 115. For another example, the GUI program 113 can control the display unit 150 to display the USB connection speed by the USB connection speed determination program 114.

The USB connection speed determination program 114 includes at least one software program for determining connection speed of a USB device. For example, when connection of the USB device is sensed, the USB connection speed determination program 114 supplies power to the USB device through a Voltage BUS (VBUS) line. If the USB device is a USB device for supporting USB 3.0, the USB connection speed determination program 114 attempts to communicate with the USB device through SuperSpeed Transmitter differential pair+(SSTX+), SSTX−, SuperSpeed Receiver differential pair+(SSRX+), and SSRX− lines. Herein, when succeeding in communicating with the USB device through the SSTX+, SSTX−, SSRX+, and SSRX− lines, the USB connection speed determination program 114 can determine connection speed of the USB device as super speed. Failing in communicating with the USB device through the SSTX+, SSTX−, SSRX+, and SSRX− lines, the USB connection speed determination program 114 can reduce a connection speed of the USB device to high speed, full speed, and low speed successively and attempt to communicate with the USB device again to determine a connection speed of the USB device. Also, if the USB device is a USB device for supporting USB 2.0, the USB connection speed determination program 114 attempts to connect through USB 1.1. If the USB connection speed determination program 114 succeeds in connecting through the USB 1.1, it attempts to connect through the USB 2.0. Herein, succeeding in connecting through the USB 2.0, the USB connection speed determination program 114 can determine connection speed of the USB device as high speed. Failing in connecting through the USB 2.0, the USB connection speed determination program 114 can determine connection speed of the USB device as full speed.

The USB connection speed adjustment program 115 can include at least one software component for determining whether to restore connection speed of the USB device. For example, the USB connection speed adjustment program 115 verifies whether there is an attempt to connect at a connection speed which is faster than current connection speed of the USB device through the USB connection speed determination program 114. For one example, when a current connection speed of the USB device is full speed, the USB connection speed adjustment program 115 can recognize whether there is an attempt to connect at super speed or high speed. If there is the attempt to connect at the connection speed which is faster than the current connection speed of the USB device, the USB connection speed adjustment program 115 can determine that the electronic device restores connection speed of the USB device. For another example, the USB connection speed adjustment program 115 can determine whether the electronic device will restore a connection speed of the USB device according to selection of a user of the electronic device through a USB connection speed adjustment menu displayed on the display unit 150.

Also, the USB connection speed restoration program 115 can include at least one software component for restoring connection speed of the USB device. For one example, the USB connection speed adjustment program 115 can block power which is being supplied to the USB device through the VBUS line and supply power again. That is, the USB connection speed adjustment program 115 can attempt to reconnect with the USB device and determine connection speed of the USB device again. For another example, the USB connection speed adjustment program 115 can restore connection speed of the USB device by changing a level of current which is being supplied to the USB device through the VBUS and supplying the changed current. For another example, the USB connection speed adjustment program 115 can change a USB phytune register value and restore a connection speed of the USB device. Herein, the change of the USB phytune register value has an influence on USB signal quality. The USB signal quality can be expressed by eye diagrams shown in FIGS. 7A and 7B. Herein, the USB phytune register value can include at least one of Txhsvxtune for transmitter High-Speed (HS) Crossover Adjustment), Txvreftune for HS DC voltage level adjustment, Txrisetune for HS transmitter rise/fall time adjustment, Txpreemphasistune for HS transmitter pre-emphasis enable, Txfslstune for full speed (FS)/low speed (LS) source impedance adjustment), Sqrxtune for Squelch threshold adjustment, and Compdistune for disconnect threshold adjustment. For another example, the USB connection speed adjustment program 115 can change a value of an equalizer and restore a connection speed of the USB device. Herein, the equalizer is a chipset which reinforces a high frequency component attenuated by transmission lines. The equalizer can have an influence on USB signal quality through the change of the equalizer value. In addition, the USB connection speed adjustment program 115 can combine one or more of the methods of restoring the connection speed of the USB device and restore the connection speed of the USB device.

The application program 116 includes a software component for at least one application program installed in the electronic device 100.

The processor unit 120 can include a memory interface 121, at least one processor 122, and a peripheral interface 123. Herein, the memory interface 121, the at least one processor 122, and the peripheral interface 123 which are included in the processor unit 120 can be integrated in at least one Integrated Circuit (IC) or be separately implemented.

The memory interface 121 controls that a component like the processor 122 or the peripheral interface 123 accesses the memory 110.

The peripheral interface 123 controls connection among an I/O peripheral of the electronic device 100, the processor 122, and the memory interface 121.

Figure 2:
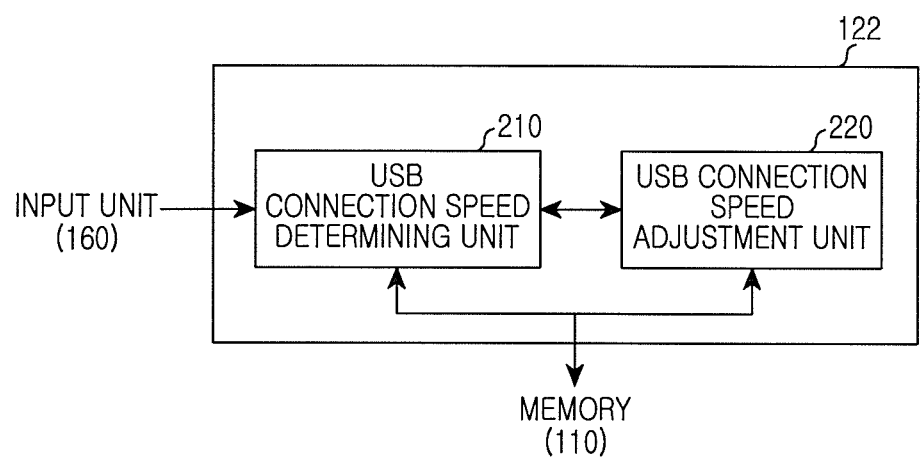
FIG. 2 is a block diagram illustrating detailed configuration of a processor according to one embodiment of the present disclosure.

The processor 122 provides a variety of multimedia services using at least one software program. Also, the processor 122 executes at least one program stored in the memory 110 and provides a service according to the corresponding program. For one example, as shown in FIG. 2, the processor 122 can be configured to execute the USB connection speed determination program 114 and determine connection speed of the USB device. For another example, as shown in FIG. 2, the processor 122 can be configured to execute the USB connection speed adjustment program 115 and determine whether to restore connection speed of the USB device. For another example, as shown in FIG. 2, the processor 122 can be configured to execute the USB connection speed adjustment program 115 and restore connection speed of the USB device.

The audio processing unit 130 provides an audio interface between the user and the electronic device 100 through a speaker 131 and a microphone 132.

The I/O controller 140 provides an interface between I/O devices, such as the display device 150 and the input unit 160, and the peripheral interface 123.

The display unit 150 displays state information of the electronic device 100, characters input by the user, moving pictures, still pictures, etc. For one example, the display unit 150 displays information of an application program executed by the processor 122. For another example, the display unit 150 can display a USB connection speed adjustment menu provided by the USB connection speed adjustment program 115 according to control of the GUI program 113. For another example, the display unit 150 can display USB connection speed provided by the USB connection speed determination program 114 according to control of the GUI program 113.

The input unit 160 provides input data generated by selection of the user to the processor unit 120 through the I/O controller 140. Herein, the input unit 160 can include a keypad including at least one hardware button, a touch pad for sensing touch information, etc. For example, the input unit 160 can provide the touch information sensed through the touch pad to the processor 122 through the I/O controller 140. Also, the input unit 160 can provide connection with the USB device.

In addition, the electronic device 100 further includes a communication system. The communication system can include at least one software component for performing a communication function for voice and data communication. Herein, the communication system can be classified into a plurality of communication sub-modules which support different communication networks. For example, the communication network can be, but is not limited to, any one of a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless Local Area Network (LAN), a Bluetooth network, and a Near Field Communication (NFC) network.

FIG. 2 is a block diagram illustrating detailed configuration of a processor according to one embodiment of the present disclosure.

As shown in FIGS. 1 and 2, the processor 122 includes a USB connection speed determining unit 210 and a USB connection speed restoring unit 220.

The USB connection speed determining unit 210 executes the USB connection speed determination program 114 of the program storing unit 111 and determines connection speed of a USB device. For example, if connection of the USB device is sensed, the USB connection speed determining unit 210 supplies power to the USB device through a VBUS line. If the USB device is a USB device for supporting USB 3.0, the USB connection speed determining unit 210 attempts to communicate with the USB device through SSTX+, SSTX−, SSRX+, and SSRX− lines. Herein, Succeeding in communicating with the USB device through the SSTX+, SSTX−, SSRX+, and SSRX− lines, the USB connection speed determining unit 210 can determine a connection speed of the USB device as super speed. Failing in communicating with the USB device through the SSTX+, SSTX−, SSRX+, and SSRX− lines, the USB connection speed determining unit 210 can reduce connection speed of the USB device to high speed, full speed, and low speed successively and attempt to communicate with the USB device again to determine connection speed of the USB device. Also, if the USB device is a USB device for supporting USB 2.0, the USB connection speed determining unit 210 attempts to connect through USB 1.1. If the USB connection speed determining unit 210 succeeds in connecting through the USB 1.1, it attempts to connect through the USB 2.0. Herein, Succeeding in connecting through the USB 2.0, the USB connection speed determining unit 210 can determine a connection speed of the USB device as high speed. Failing in connecting through the USB 2.0, the USB connection speed determining unit 210 can determine a connection speed of the USB device as full speed.

The USB connection speed restoring unit 220 executes the USB connection speed adjustment program 115 of the program storing unit 111 and determines whether to restore connection speed of the USB device. For example, the USB connection speed restoring unit 220 monitors whether there is an attempt to connect at a connection speed which is faster than current connection speed of the USB device through the USB connection speed determining unit 210. For one example, when current connection speed of the USB device is full speed, the USB connection speed restoring unit 220 can recognize whether there is an attempt to connect at super speed or high speed. If there is the attempt to connect at the connection speed which is faster than the current connection speed of the USB device, the USB connection speed restoring unit 220 can determine that it restores connection speed of the USB device. For another example, the USB connection speed restoring unit 220 can determine whether it will restore a connection speed of the USB device according to selection of a user of the electronic device through a USB connection speed adjustment menu displayed on the display unit 150.

Also, the USB connection speed restoring unit 220 executes the USB connection speed adjustment program 115 of the program storing unit 111 and restores connection speed of the USB device. For one example, the USB connection speed restoring unit 220 can block power which is being supplied to the USB device through the VBUS line and supply power again. That is, the USB connection speed restoring unit 220 can attempt to reconnect with the USB device and determine connection speed of the USB device again. For another example, the USB connection speed restoring unit 220 can restore connection speed of the USB device by changing a level of current which is being supplied to the USB device through the VBUS and supplying the changed current. For another example, the USB connection speed restoring unit 220 can change a USB phytune register value and restore a connection speed of the USB device. Herein, the change of the USB phytune register value has an influence on USB signal quality. The USB signal quality can be expressed by eye diagrams shown in FIGS. 7A and 7B. Herein, the USB phytune register value can include at least one of Txhsvxtune for transmitter High-Speed (HS) crossover adjustment, Txvreftune for HS DC voltage level adjustment, Txrisetune for HS Transmitter rise/fall time adjustment, Txpreemphasistune for HS transmitter pre-emphasis enable, Txfslstune for FS/LS source impedance adjustment, Sqrxtune for Squelch threshold adjustment, and compdistune (Disconnect Threshold Adjustment). For another example, the USB connection speed restoring unit 220 can change a value of an equalizer and restore a connection speed of the USB device. Herein, the equalizer is a chipset which reinforces a high frequency component attenuated by transmission lines. The equalizer can have an influence on USB signal quality through the change of the equalizer value. In addition, the USB connection speed restoring unit 220 can combine one or more of the methods of restoring the connection speed of the USB device and restore the connection speed of the USB device.

In addition, the processor 122 can further include a display controller which executes the GUI program 113 of the program storing unit 111 and provides a UI as graphics on the display unit 150. For one example, the display controller controls the display unit 150 to display information of an application program executed by the processor 122. For another example, the display controller controls the display unit 150 to display a USB connection speed adjustment menu by the USB connection speed adjustment unit 220. For another example, the display controller controls the display unit 150 to display a USB connection speed by the USB connection speed determining unit 210.

In addition, the electronic device can include a separate module including at least one of the USB connection speed determining unit 210 and the USB connection speed restoring unit 220.

Figure 3:
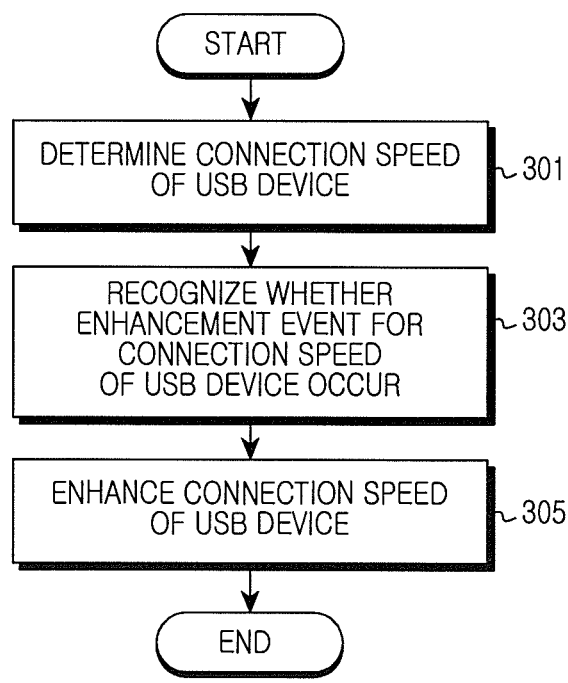
FIG. 3 is a flowchart illustrating a process of restoring a connection speed of a USB device in an electronic device according to one embodiment of the present disclosure.

FIG. 3 is a flowchart illustrating a process of restoring a connection speed of a USB device in an electronic device according to one embodiment of the present disclosure.

Referring to FIG. 3, the electronic device determines connection speed of the USB device in step 301. For example, if connection of the USB device is sensed, the electronic device supplies power to the USB device through a VBUS line. If the USB device is a USB device for supporting USB 3.0, the electronic device attempts to communicate with the USB device through SSTX+, SSTX−, SSRX+, and SSRX− lines. Herein, Succeeding in communicating with the USB device through the SSTX+, SSTX−, SSRX+, and SSRX− lines, the electronic device can determine connection speed of the USB device as super speed. Failing in communicating with the USB device through the SSTX+, SSTX−, SSRX+, and SSRX− lines, the electronic device can reduce connection speed of the USB device to high speed, full speed, and low speed successively and attempt to communicate with the USB device again to determine connection speed of the USB device. Also, if the USB device is a USB device for supporting USB 2.0, the electronic device attempts to connect through USB 1.1. If the electronic device succeeds in connecting through the USB 1.1, it attempts to connect through the USB 2.0. Herein, Succeeding in connecting through the USB 2.0, the electronic device can determine connection speed of the USB device as high speed. Failing in connecting through the USB 2.0, the electronic device can determine connection speed of the USB device as full speed.

After determining the connection speed of the USB device, the electronic device recognizes whether an enhancement event for the connection speed of the USB device occurs in step 303. For one example, the electronic device can automatically recognize whether to restore connection speed of the USB device. For another example, the electronic device can recognize whether to restore connection speed of the USB device according to selection of its user.

When the enhancement event for the connection speed of the USB device occurs, the electronic device enhances the connection speed of the USB device in step 305. For one example, the electronic device can block power which is being supplied to the USB device through the VBUS line and supply power again. That is, the electronic device can attempt to reconnect with the USB device and determine connection speed of the USB device again. For another example, the electronic device can restore connection speed of the USB device by changing a level of current which is being supplied to the USB device through the VBUS and supplying the changed current. For another example, the electronic device can change a USB phytune register value and restore a connection speed of the USB device. Herein, the change of the USB phytune register value has an influence on USB signal quality. The USB signal quality can be expressed by eye diagrams shown in FIGS. 7A and 7B. Herein, the USB phytune register value can include at least one of Txhsvxtune for Transmitter High-Speed Crossover Adjustment, txvreftune for HS DC Voltage Level Adjustment, txrisetune for HS Transmitter Rise/Fall Time Adjustment, txpreemphasistune for HS transmitter pre-emphasis enable, txfslstune for FS/LS Source Impedance Adjustment, sqrxtune for Squelch Threshold Adjustment, and compdistune for Disconnect Threshold Adjustment. For another example, the electronic device can change a value of an equalizer and restore connection speed of the USB device. Herein, the equalizer is a chipset which reinforces a high frequency component attenuated by transmission lines. The equalizer can have an influence on USB signal quality through the change of the equalizer value. In addition, the electronic device can combine one or more of the methods of restoring the connection speed of the USB device and restore the connection speed of the USB device.

Thereafter, the electronic device can end the algorithm in associated with FIG. 3.

Figure 4:
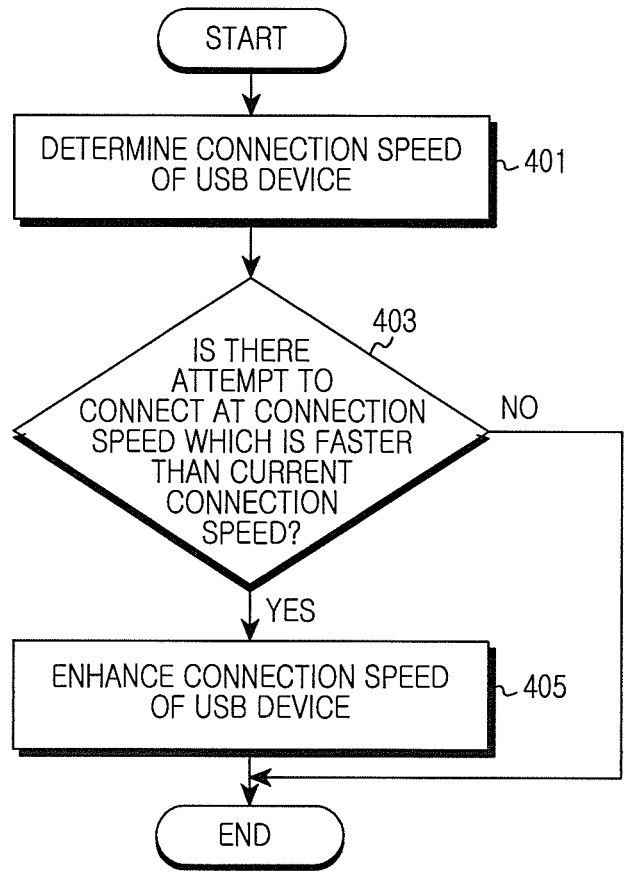
FIG. 4 is a flowchart illustrating a process of restoring a connection speed of a USB device according to whether there is an attempt to connect at connection speed which is faster than current connection speed of the USB device in an electronic device according to another embodiment of the present disclosure.

FIG. 4 is a flowchart illustrating a process of restoring connection speed of a USB device according to whether there is an attempt to connect at connection speed which is faster than current connection speed of the USB device in an electronic device according to another embodiment of the present disclosure.

Referring to FIG. 4, the electronic device determines connection speed of the USB device in step 401. For example, if connection of the USB device is sensed, the electronic device supplies power to the USB device through a VBUS line. If the USB device is a USB device for supporting USB 3.0, the electronic device attempts to communicate with the USB device through SSTX+, SSTX−, SSRX+, and SSRX− lines. Herein, Succeeding in communicating with the USB device through the SSTX+, SSTX−, SSRX+, and SSRX− lines, the electronic device can determine a connection speed of the USB device as super speed. Failing in communicating with the USB device through the SSTX+, SSTX−, SSRX+, and SSRX− lines, the electronic device can reduce a connection speed of the USB device to high speed, full speed, and low speed successively and attempt to communicate with the USB device again to determine a connection speed of the USB device.

After determining the connection speed of the USB device, the electronic device verifies whether there is an attempt to connect at a connection speed which is faster than a current connection speed of the USB device in step 403. For one example, when the current connection speed of the USB device is the full speed, the electronic device can recognize whether there is an attempt to connect at super speed or high speed. If there is no attempt to connect at the connection speed which is faster than the current connection speed of the USB device, the electronic device ends the algorithm in associated with FIG. 4.

When there is the attempt to connect at the connection speed which is faster than the current connection speed of the USB device, the electronic device restores the connection speed of the USB device in step 405. For one example, the electronic device can block power which is being supplied to the USB device through the VBUS line and supply power again. That is, the electronic device can attempt to reconnect with the USB device and determine a connection speed of the USB device again. For another example, the electronic device can restore the connection speed of the USB device by changing a level of current which is being supplied to the USB device through the VBUS and supplying the changed current. For another example, the electronic device can change a USB phytune register value and restore a connection speed of the USB device. Herein, the change of the USB phytune register value has an influence on USB signal quality. The USB signal quality can be expressed by eye diagrams shown in FIGS. 7A and 7B. Herein, the USB phytune register value can include at least one of Txhsvxtune (Transmitter High-Speed Crossover Adjustment), txvreftune (HS DC Voltage Level Adjustment), txrisetune (HS Transmitter Rise/Fall Time Adjustment), txpreemphasistune (HS transmitter pre-emphasis enable), txfslstune (FS/LS Source Impedance Adjustment), sqrxtune (Squelch Threshold Adjustment), and compdistune (Disconnect Threshold Adjustment). For another example, the electronic device can change a value of an equalizer and restore a connection speed of the USB device. Herein, the equalizer is a chipset which reinforces a high frequency component attenuated by transmission lines. The equalizer can have an influence on USB signal quality through the change of the equalizer value. In addition, the electronic device can combine one or more of the methods of restoring the connection speed of the USB device and restore the connection speed of the USB device.

Thereafter, the electronic device can end the algorithm in association with FIG. 4.

Figure 5:
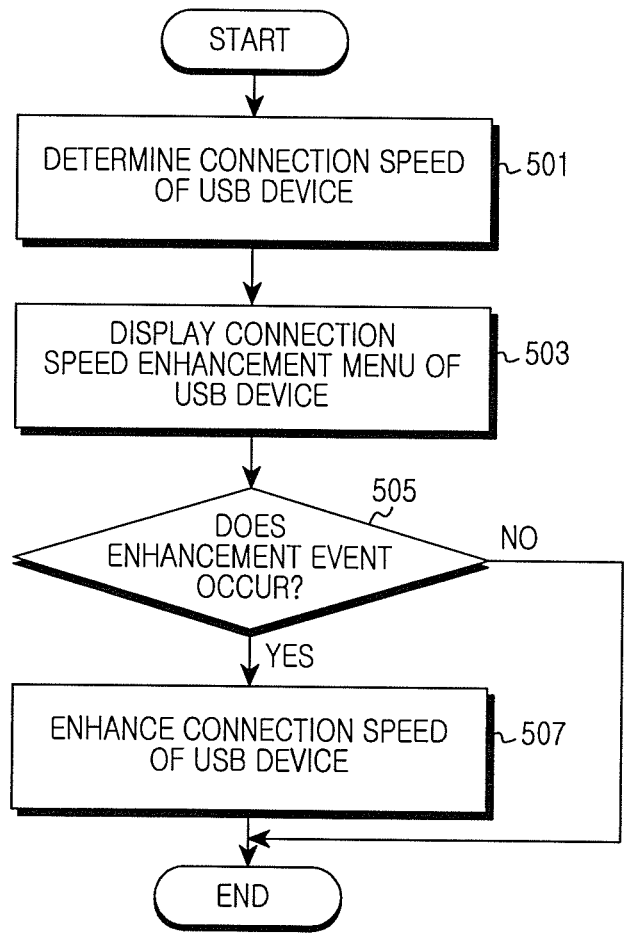
FIG. 5 is a flowchart illustrating a process of displaying a connection speed enhancement menu of a USB device and restoring a connection speed of the USB device in an electronic device according to one embodiment of the present disclosure.

FIG. 5 is a flowchart illustrating a process of adjusting a connection speed of the USB device in an electronic device according to one embodiment of the present disclosure.

Referring to FIG. 5, the electronic device determines a connection speed of the USB device in step 501. For example, if connection of the USB device is sensed, the electronic device supplies power to the USB device through a VBUS line. If the USB device is a USB device for supporting USB 3.0, the electronic device attempts to communicate with the USB device through SSTX+, SSTX−, SSRX+, and SSRX− lines. Herein, Succeeding in communicating with the USB device through the SSTX+, SSTX−, SSRX+, and SSRX− lines, the electronic device can determine a connection speed of the USB device as super speed. Failing in communicating with the USB device through the SSTX+, SSTX−, SSRX+, and SSRX− lines, the electronic device can reduce connection speed of the USB device to high speed, full speed, and low speed successively and attempt to communicate with the USB device again to determine connection speed of the USB device. Also, if the USB device is a USB device for supporting USB 2.0, the electronic device attempts to connect through USB 1.1. If the electronic device succeeds in connecting through the USB 1.1, it attempts to connect through the USB 2.0. Herein, Succeeding in connecting through the USB 2.0, the electronic device can determine a connection speed of the USB device as high speed. Failing in connecting through the USB 2.0, the electronic device can determine a connection speed of the USB device as full speed.

After determining the connection speed of the USB device, the electronic device displays a connection speed adjustment menu of the USB device in step 503. For example, referring to FIG. 6A, the electronic device denoted by 601 can display a connection speed adjustment menu 611 of the USB device. Herein, the electronic device 601 can display current connection speed on the connection speed adjustment menu 611. In addition, the electronic device 601 can display current connection speed as an icon 603.

After displaying the connection speed adjustment menu, the electronic device monitors whether an enhancement event occurs in step 505. If the enhancement event does not occur, the electronic device can end the algorithm in associated with FIG. 5. For example, referring to FIG. 6A, when an "OK" 615 is selected on the connection speed adjustment menu 611, the electronic device can recognize that a user of the electronic device does not restore connection speed of the USB device. Also, displaying the connection speed adjustment menu 611 during a previously defined time and not sensing selection for a "restore" 613, the electronic device can recognize that the user does not restore connection speed of the USB device.

On the other hand, when the enhancement event is generated, the electronic device restores the connection speed of the USB device in step 507. That is, referring to FIG. 6A, when the "restore" 613 is selected on the connection speed adjustment menu 611, the electronic device can recognize that the user restore a connection speed of the USB device. For one example, the electronic device can block power which is being supplied to the USB device through the VBUS line and supply power again. That is, the electronic device can attempt to reconnect with the USB device and determine a connection speed of the USB device again. For another example, the electronic device can restore a connection speed of the USB device by changing a level of current which is being supplied to the USB device through the VBUS and supplying the changed current. For another example, the electronic device can change a USB phytune register value and restore a connection speed of the USB device. Herein, the change of the USB phytune register value has an influence on USB signal quality. The USB signal quality can be expressed by eye diagrams shown in FIGS. 7A and 7B. Herein, the USB phytune register value can include at least one of Txhsvxtune (Transmitter High-Speed Crossover Adjustment), txvreftune (HS DC Voltage Level Adjustment), txrisetune (HS Transmitter Rise/Fall Time Adjustment), txpreemphasistune (HS transmitter pre-emphasis enable), txfslstune (FS/LS Source Impedance Adjustment), sqrxtune (Squelch Threshold Adjustment), and compdistune (Disconnect Threshold Adjustment). For another example, the electronic device can change a value of an equalizer and restore a connection speed of the USB device. Herein, the equalizer is a chipset which reinforces a high frequency component attenuated by transmission lines. The equalizer can have an influence on USB signal quality through the change of the equalizer value. In addition, the electronic device can combine one or more of the methods of restoring the connection speed of the USB device and restore the connection speed of the USB device.

Figure 6A:
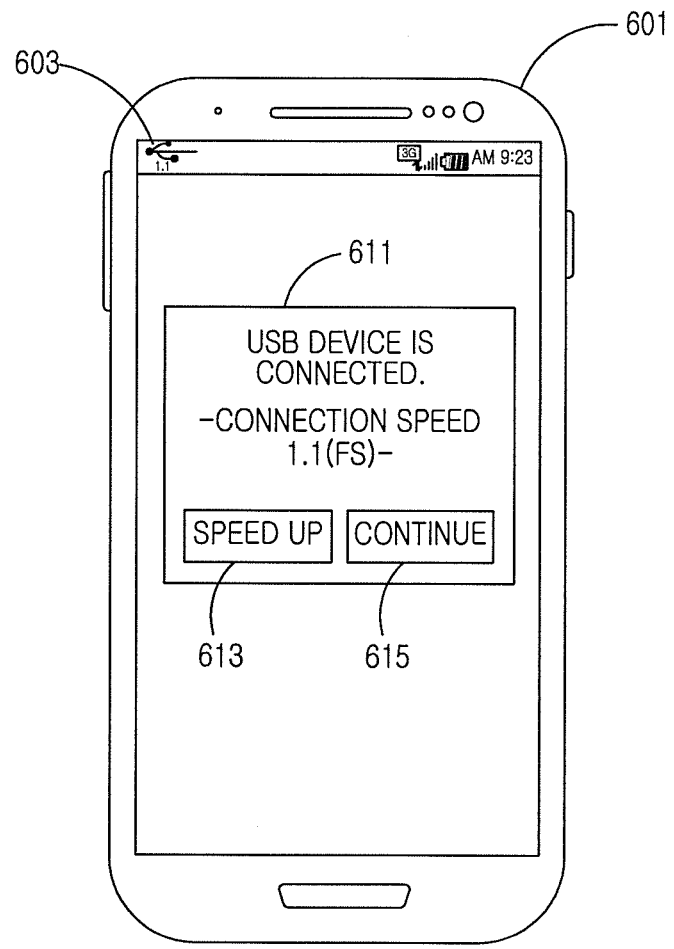
FIGS. 6A and 6B are screens illustrating a process of displaying a connection speed enhancement menu of a USB device in an electronic device according to one embodiment of the present disclosure.
Figure 6B:
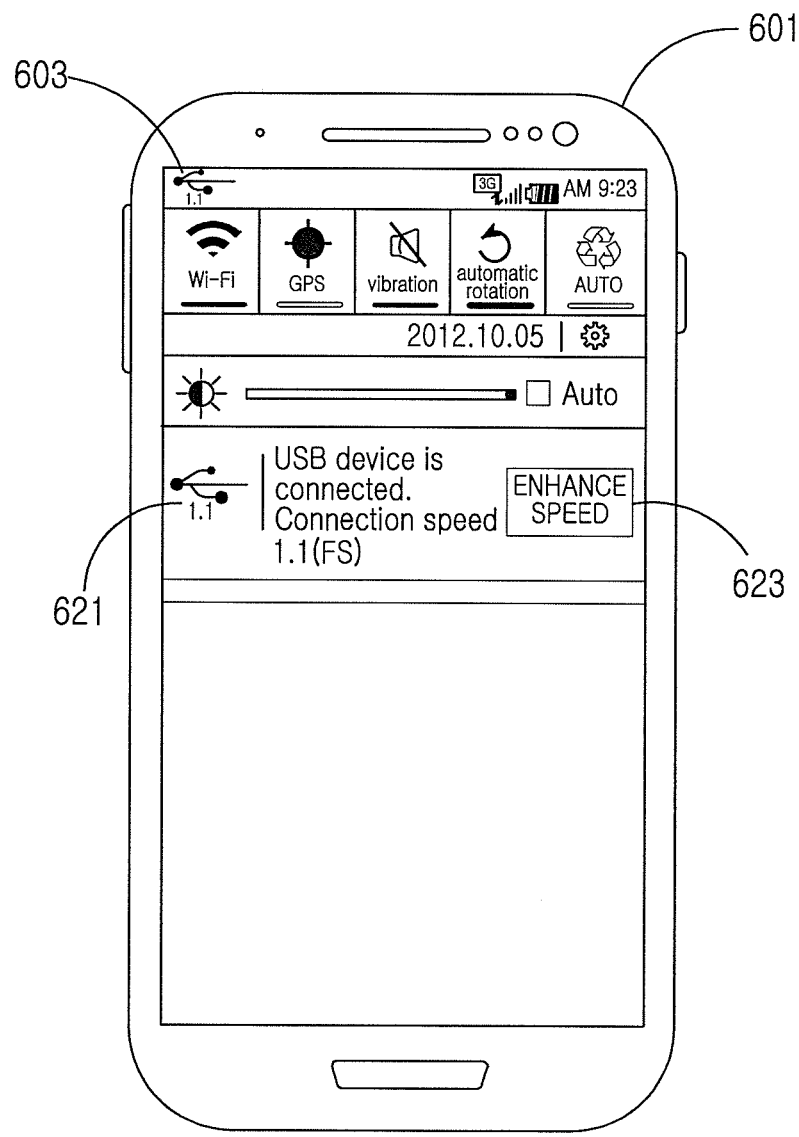
Figure 7A:
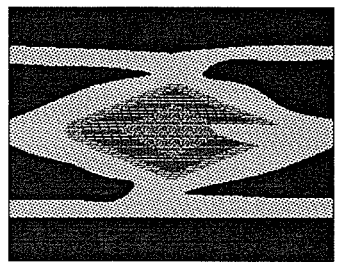
FIGS. 7A and 7B illustrate examples of an eye diagram in an electronic device according to one embodiment of the present disclosure.
Figure 7B:
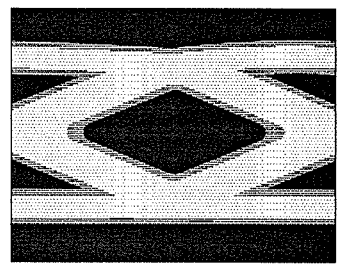

In addition, referring to FIG. 6B, the electronic device can display a connection speed adjustment menu 621 of the USB device through a quick panel (or a notification bar and a setting window). That is, the electronic device can display the connection speed adjustment menu 621 of the USB device by selection of the user. Herein, when selection for a "restore" 623 is sensed, the electronic device can restore a connection speed of the USB device.

Thereafter, the electronic device can end the algorithm in associated with FIG. 5.

As described above, the electronic device can allow the USB device to operate at supportable maximum connection speed by restoring connection speed of the USB device.

It will be appreciated that embodiments of the present disclosure according to the claims and description in the specification can be realized in the form of hardware, software or a combination of the hardware and the software.

Any such software can be stored in a computer readable storage medium. The computer readable storage medium stores one or more programs (software modules), each of the one or more programs comprising instructions, which when executed by the one or more processors in an electronic device, cause the electronic device to perform a method of the present disclosure.

Any such software can be stored in the form of volatile or non-volatile storage such as, for example, a storage device like a Read Only Memory (ROM), whether erasable or rewritable or not, or in the form of a memory such as, for example, a Random Access Memory (RAM), memory chips, a device or integrated circuits or on an optically or magnetically readable medium such as, for example, a Compact Disc (CD), Digital Versatile Disc (DVD), magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising codes for implementing an apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method in an electronic device, the method comprising:
    connecting a Universal Serial Bus (USB) device to the electronic device at a first connection speed the USB device among a plurality of connection speeds;
    displaying a menu to receive an user input for enhancing the first connection speed on a display of the electronic device;
    in response to receiving the user input for enhancing the first connection speed, determining whether a faster connection speed of the USB device is available among the plurality of connection speeds than the first connection speed; and
    reconnecting the USB device to the electronic device at the faster connection speed of the USB device when the faster connection speed of the USB device is available.

2. The method of claim 1, further comprising displaying the first connection speed on a display unit of the electronic device.

3. The method of claim 1, wherein recognizing whether an enhancement event is generated comprises recognizing whether there is an attempt to connect at a connection speed that is faster than the first connection speed.

4. The method of claim 1, wherein enhancing the first connection speed of the USB device comprises blocking power which is being supplied to the USB device and supplying power again.

5. The method of claim 1, wherein enhancing the first connection speed of the USB device comprises changing a level of current which is being supplied to the USB device.

6. The method of claim 1, wherein enhancing first the connection speed of the USB device comprises changing a USB phytune register value.

7. The method of claim 6, wherein the USB phytune register value includes at least one of a Txhsvxtune for a transmitter high-speed (HS) crossover adjustment, txvreftune for a HS DC voltage level adjustment, txrisetune for a HS transmitter rise and/or fall time adjustment, txpreemphasistune for a HS transmitter pre-emphasis enable, txfslstune for a full speed (FS) and/or a low speed (LS) source impedance adjustment, sqrxtune for a Squelch threshold adjustment, and compdistune for a disconnect threshold adjustment.

8. The method of claim 1, further comprising changing a value of a register and wherein an equalizer is a chipset for reinforcing a high frequency component attenuated by transmission lines.

9. The method of claim 1, further comprising displaying a connection speed restoration menu of the USB device when the first connection speed is determined.

10. The method of claim 9, further comprising recognizing whether an enhancement event for the faster connection speed of the USB device occurs through the connection speed restoration menu.

11. An electronic device comprising:
at least one processor;
at least one memory; and
at least one program which is stored in the at least one memory and is configured to be executed by the at least one processor,
wherein the at least one processor is configured to:
connect a Universal Serial Bus (USB) device to the electronic device at a first connection speed of the USB device among a plurality of connection speeds;
display a menu to receive an user input for enhancing the first connection speed on a display of the electronic device;
in response to in response to receiving the user input for enhancing the first connection speed, determine whether a faster connection speed of the USB device is available among the plurality of connection speeds than the first connection speed; and
enhance the first connection speed of the USB device to the faster connection speed of the USB device.

12. The electronic device of claim 11, wherein the at least one processor is configured to display the first connection speed on a display unit of the electronic device.

13. The electronic device of claim 11, wherein the at least one processor is configured to recognize that an enhancement event occurs when there is an attempt to connect at a connection speed which is faster than the first connection speed.

14. The electronic device of claim 11, wherein the at least one processor is configured to block power which is being supplied to the USB device, supply power again, and enhance the first connection speed of the USB device.

15. The electronic device of claim 11, wherein the at least one processor is configured to change a level of current which is being supplied to the USB device and enhance the first connection speed of the USB device.

16. The electronic device of claim 11, wherein the at least one processor is configured to change a USB phytune register value and restores the faster connection speed of the USB device.

17. The electronic device of claim 16, wherein the USB phytune register value includes at least one of Txhsvxtune for a transmitter High-Speed (HS) Crossover Adjustment, Txvreftune for a HS DC Voltage Level Adjustment, Txrisetune for a HS transmitter rise and/or fall time adjustment, Txpreemphasistune for an HS transmitter pre-emphasis enablity, Txfslstune for a full speed (FS) and/or low speed (LS) source impedance adjustment, Sqrxtune for a squelch threshold adjustment, and Compdistune for a disconnect threshold adjustment.

18. The electronic device of claim 11, wherein the at least one processor is configured to change a register value and enhance the first connection speed of the USB device and wherein an equalizer is a chipset for reinforcing a high frequency component attenuated by transmission lines.

19. The electronic device of claim 11, wherein the at least one processor is configured to display a connection speed restoration menu of the USB device when the first connection speed is determined.

20. The electronic device of claim 19, wherein the at least one processor is configured to recognize whether an enhancement event for the faster connection speed of the USB device is generated through the connection speed restoration menu.

* * * * *